US012645568B2

(12) United States Patent
Segal et al.

(10) Patent No.: US 12,645,568 B2
(45) Date of Patent: Jun. 2, 2026

(54) SOFTWARE BILL-OF-MATERIALS VIA STACK SAMPLING

(71) Applicant: Kodem Security Ltd., Tel Aviv (IL)

(72) Inventors: Eran Segal, Ganei Tikva (IL); Moshe Siman Tov Bustan, Holon (IL); Pavel Furman, Netanya (IL); Idan Bartura, Herzliya (IL); Aviv Mussinger, Tel Aviv (IL)

(73) Assignee: Kodem Security Ltd., Tel Aviv (IL)

( * ) Notice: Subject to any disclaimer, the term of this patent is extended or adjusted under 35 U.S.C. 154(b) by 0 days.

(21) Appl. No.: 18/635,541

(22) Filed: Apr. 15, 2024

(65) Prior Publication Data

US 2025/0322355 A1     Oct. 16, 2025

Related U.S. Application Data

(63) Continuation of application No. 18/635,419, filed on Apr. 15, 2024.

(51) Int. Cl.
| | | |
|---|---|---|
| *G06F 9/455* | (2018.01) | |
| *G06F 9/30* | (2018.01) | |
(Continued)

(52) U.S. Cl.
CPC ........ *G06F 11/3636* (2013.01); *G06F 11/302* (2013.01); *G06F 11/3037* (2013.01); *G06F 11/3644* (2013.01); *G06Q 10/0875* (2013.01)

(58) Field of Classification Search
CPC ........................ G06Q 10/0875; G06F 11/3037
See application file for complete search history.

(56) References Cited

U.S. PATENT DOCUMENTS

| | | | | |
|---|---|---|---|---|
| 7,716,647 B2 * | 5/2010 | Loh | ..................... | G06F 11/3409 |
| | | | | 717/127 |
| 8,478,948 B2 * | 7/2013 | Panchenko | ......... | G06F 12/1441 |
| | | | | 717/124 |

(Continued)

FOREIGN PATENT DOCUMENTS

| EP | 3009935 A1 | 4/2016 |
|---|---|---|

OTHER PUBLICATIONS

EclEmma 3.1.9, Java Code Coverage for Eclipse, pp. 1-2, downloaded from https://www.jacoco.org (Jul. 10, 2024).

(Continued)

*Primary Examiner* — Talia F Crawley
(74) *Attorney, Agent, or Firm* — FisherBroyles, LLP; Roger L. Browdy; James E. Mrose

(57) ABSTRACT

A system of determining a software bill-of-materials (RBOM) of an operating environment, the system comprising a processing circuitry configured to: a) access a memory space of a first process executing in the operating environment; b) for one or more threads of the first process: read contents of one or more memory location of a thread stack associated with the respective thread, determine whether a contained value of a respective memory location is a code section execution address, and responsive to the contained value of the respective memory location of the thread stack being a code section execution address: i) determine, based on the memory space of the first process and/or an executable file associated with the first process, a code section identifier associated with the code section, and ii) add the code section identifier associated with the code section to the RBOM.

7 Claims, 10 Drawing Sheets

| Managed Framework loads a code section (Code section Description Structure) into memory space |
|---|
| 105 |

↓

| Invocations of the function affect Code Section Execution indications (memory locations, profile control fields etc.) |
|---|
| 110 |

↓

| Optionally: Managed Framework unloads the code section from memory space (e.g. due to lack of use, memory reclamation) |
|---|
| 115 |

↓

| Optionally: Managed Framework logs the unloading of the code section into a Unloaded Code Section Log memory structure |
|---|
| 120 |

(51) Int. Cl.

| | |
|---|---|
| *G06F 11/30* | (2006.01) |
| *G06F 11/362* | (2025.01) |
| *G06Q 10/0875* | (2023.01) |

(56) References Cited

U.S. PATENT DOCUMENTS

| | | | |
|---|---|---|---|
| 11,550,903 B1 | 1/2023 | Epstein | |
| 11,989,572 B2 * | 5/2024 | Furman | G06F 21/57 |
| 2005/0138013 A1 * | 6/2005 | Walker | G06F 16/24552 |
| 2005/0210454 A1 | 9/2005 | DeWitt, Jr. et al. | |
| 2006/0036579 A1 | 2/2006 | Byrd et al. | |
| 2006/0294355 A1 * | 12/2006 | Zimmer | G06F 21/572 |
| | | | 713/2 |
| 2013/0246451 A1 * | 9/2013 | Kaiser | G06F 16/28 |
| | | | 707/769 |
| 2016/0357958 A1 | 12/2016 | Guidry | |
| 2019/0303815 A1 * | 10/2019 | Li | G06Q 50/04 |

| | | | |
|---|---|---|---|
| 2023/0040382 A1 | 2/2023 | Tokura et al. | |
| 2023/0044935 A1 | 2/2023 | Madineni et al. | |
| 2023/0367880 A1 * | 11/2023 | Sudhakar | G06F 21/577 |
| 2024/0020140 A1 * | 1/2024 | Furman | G06F 9/448 |

OTHER PUBLICATIONS

Memory Analyzer (MAT), Eclipse Memory Analyzer Open Source Project_The Eclipse Foundation, pp. 1-2, downloaded from http://www.eclipse.org/ (Jul. 10, 2024).

GitHub—volatilityfoundation/volatility: An advanced memory forensics framework, pp. 1-12, downloaded from https://github.com/volatilityfoundation/volatility (Jul. 10, 2024).

Off-CPU Analysis, pp. 1-14, downloaded from https://www.brendangregg.com/offcpuanalysis.html (Jul. 10, 2024).

Arash Shahkar, On Matching Binary to Source Code, The Department of Concordia Institute for Information Systems Engineering, pp. 1-99 (2016).

* cited by examiner

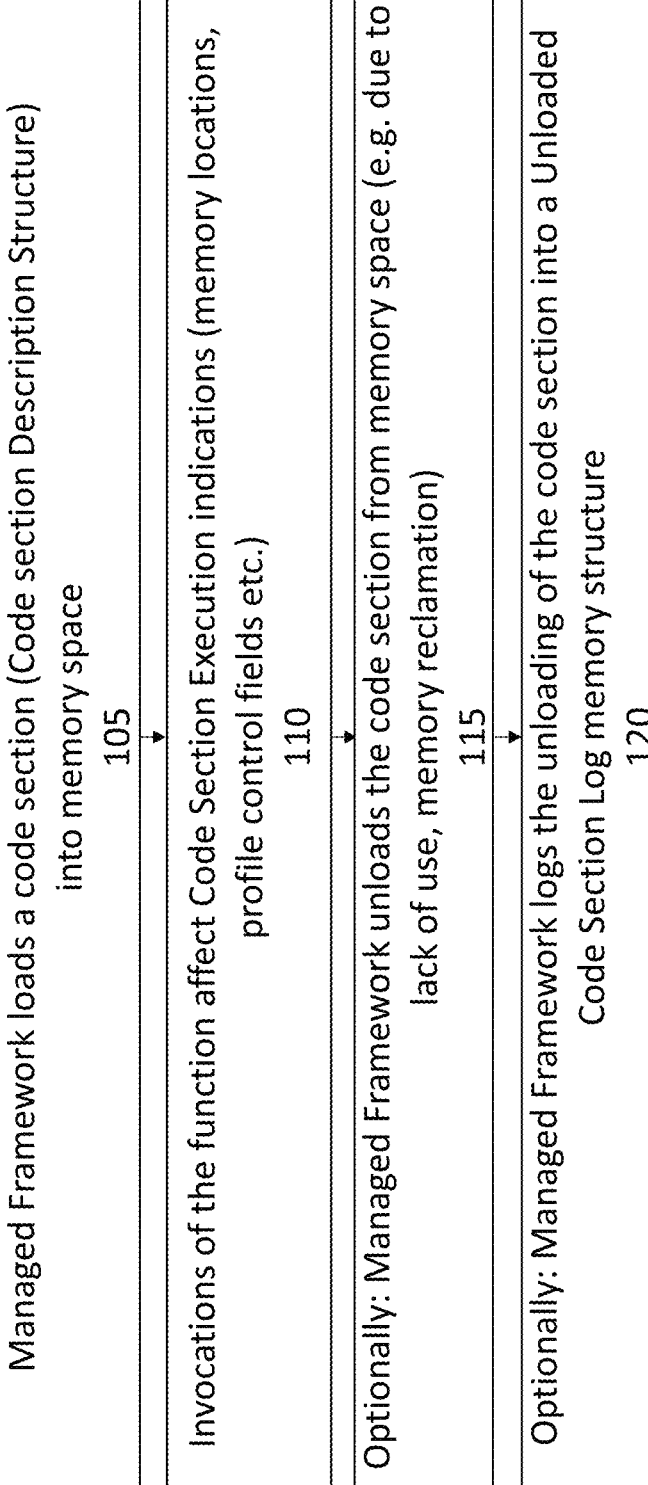

Managed Framework loads a code section (Code section Description Structure) into memory space
105

Invocations of the function affect Code Section Execution indications (memory locations, profile control fields etc.)
110

Optionally: Managed Framework unloads the code section from memory space (e.g. due to lack of use, memory reclamation)
115

Optionally: Managed Framework logs the unloading of the code section into a Unloaded Code Section Log memory structure
120

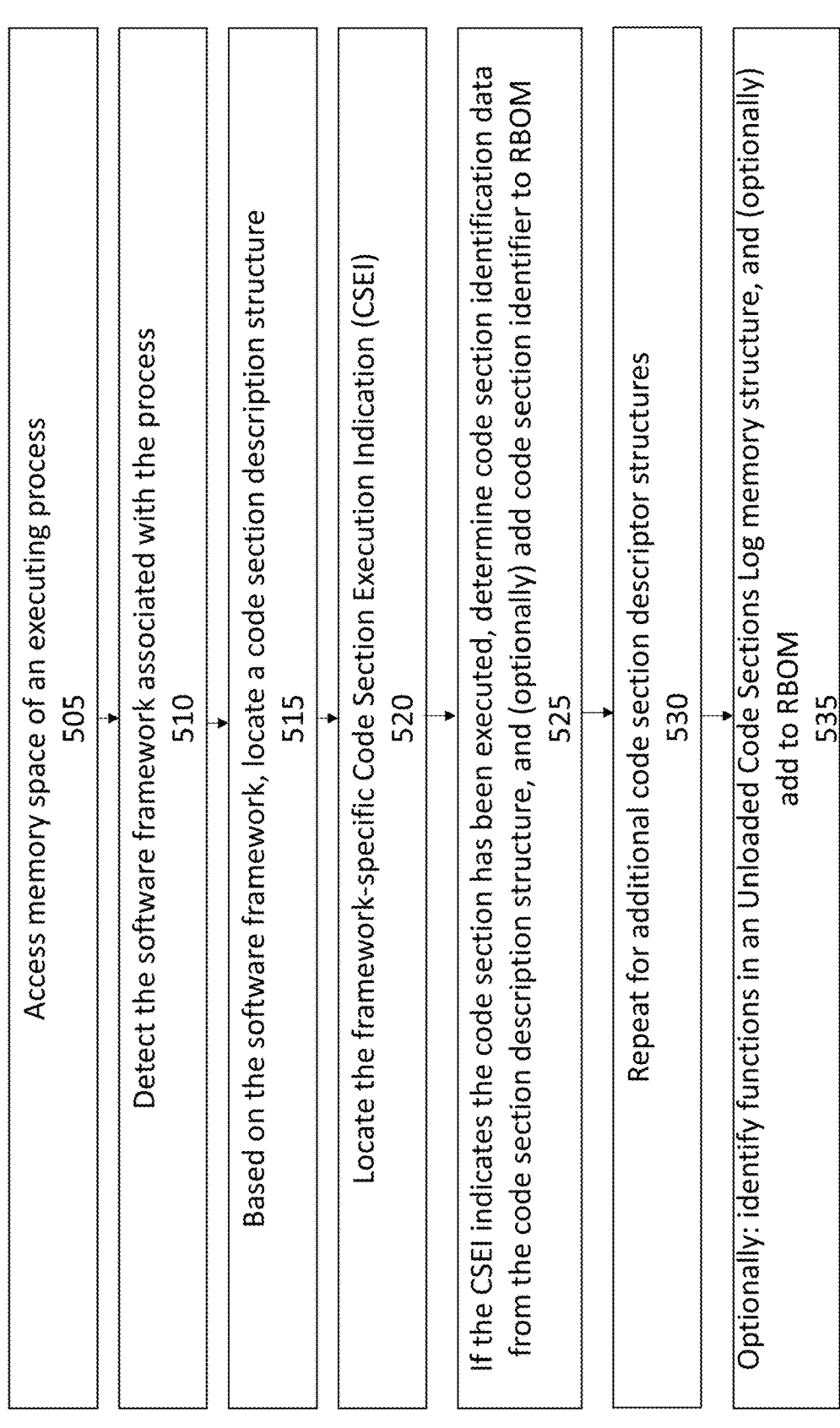

Access memory space of an executing process
505

Detect the software framework associated with the process
510

Based on the software framework, locate a code section description structure
515

Locate the framework-specific Code Section Execution Indication (CSEI)
520

If the CSEI indicates the code section has been executed, determine code section identification data from the code section description structure, and (optionally) add code section identifier to RBOM
525

Repeat for additional code section descriptor structures
530

Optionally: identify functions in an Unloaded Code Sections Log memory structure, and (optionally) add to RBOM
535

Identify the software framework of an executing software process
605

Examine the file access times of runnable files associated with the software framework
610

If a runnable file has been accessed since the start time of the process, add filepath to the RBOM
615

Fig. 8

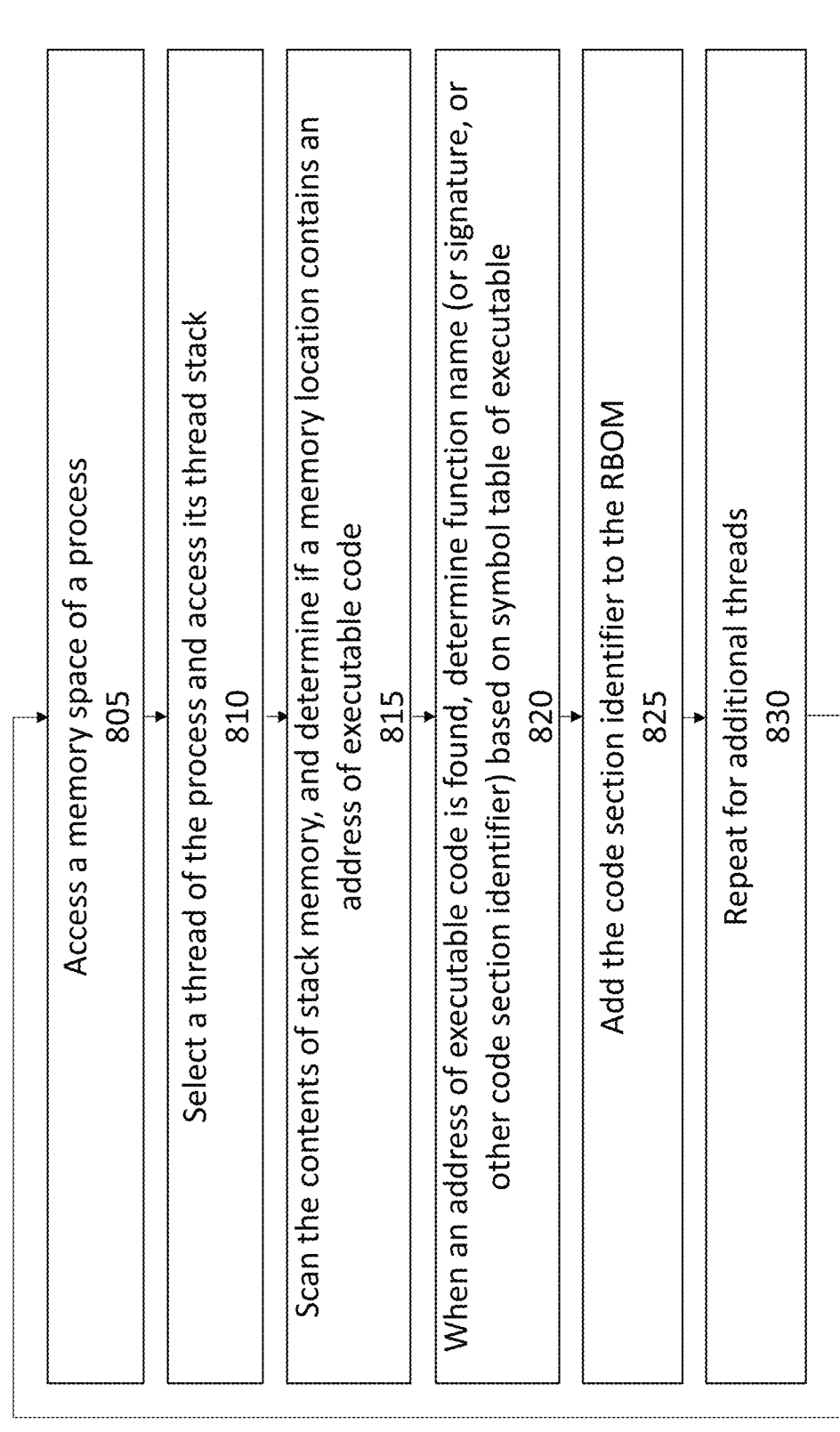

Access a memory space of a process
805

Select a thread of the process and access its thread stack
810

Scan the contents of stack memory, and determine if a memory location contains an address of executable code
815

When an address of executable code is found, determine function name (or signature, or other code section identifier) based on symbol table of executable
820

Add the code section identifier to the RBOM
825

Repeat for additional threads
830

SOFTWARE BILL-OF-MATERIALS VIA STACK SAMPLING

TECHNICAL FIELD

The presently disclosed subject matter relates to computer security, and in particular to implementation of systems of identifying active code sections of computer software.

BACKGROUND

Problems of identification of active code sections of computer software in realtime have been recognized in the conventional art and various techniques have been developed to provide solutions.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1 illustrates a flow diagram of an example method of dynamic loading and unloading of software of a managed software framework, in accordance with some embodiments of the presently disclosed subject matter;

FIG. 5 illustrates a flow diagram of an example method of identifying executed software modules of an application executing in a managed software framework, in accordance with some embodiments of the presently disclosed subject matter;

FIG. 8 illustrates a flow diagram of an example stack probing-based method of constructing a software RBOM, in accordance with some embodiments of the presently disclosed subject matter.

GENERAL DESCRIPTION

Figure 2A:
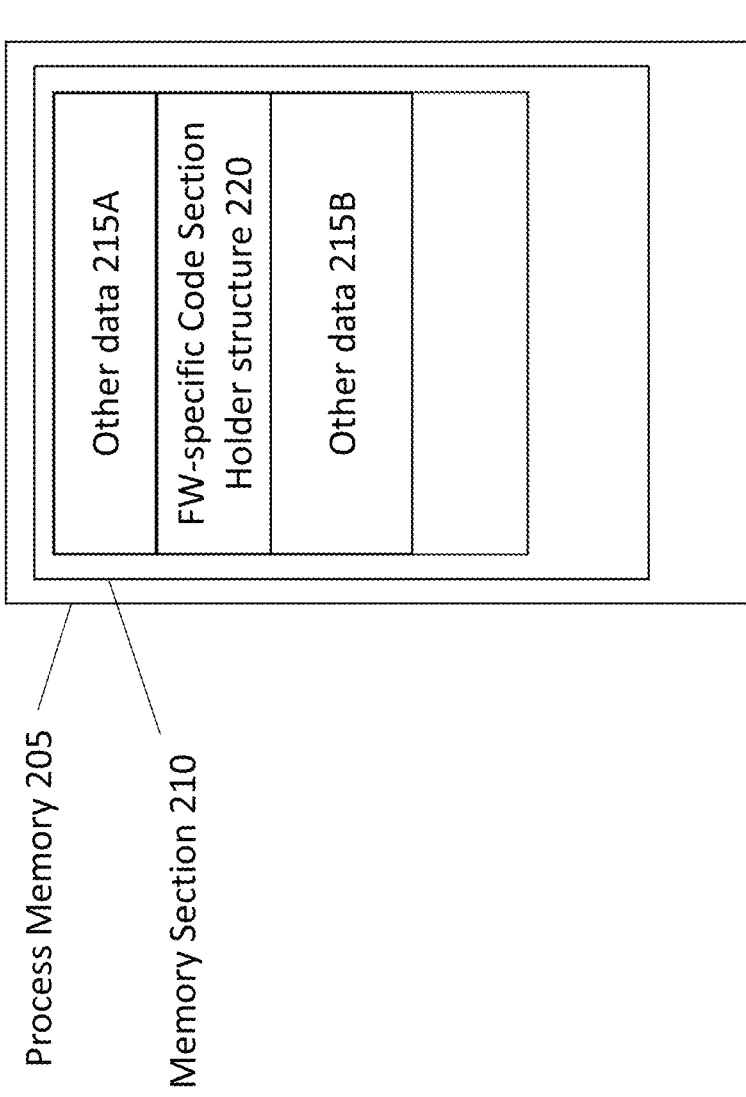
FIGS. 2A-2B illustrate example generalized logical structures that can be present in managed software frameworks, in accordance with some embodiments of the presently disclosed subject matter.

According to one aspect of the presently disclosed subject matter there is provided a system of identifying an executed code section of a software process, the system comprising a processing circuitry configured to:

a. access a memory space of a first process executing in an operating environment;

b. identify, from contents of the memory space, a software framework of the first process;

c. find, in the memory space, based on the identified software framework, a first code section description structure;

d. identify, from the first code section description structure, a code section execution indicator (CSEI) associated with a first code section; and e. determine, based on a value of the associated CSEI, whether the first code section has been executed.

In addition to the above features, the system according to this aspect of the presently disclosed subject matter can comprise one or more of features (i) to (xv) listed below, in any desired combination or permutation which is technically possible:

(i) the PC is additionally configured to:

f. add, to a software runtime bill-of-materials (RBOM), a code section identifier of the first code section, the code section identifier being based on the first code section description structure.

(ii) the PC is additionally configured to:

g. repeat c.-f. for one or more additional code section description structures.

(iii) the PC is additionally configured to:

h. responsive to an event, repeat a.-g. for one or more additional iterations.

(iv) the PC is additionally configured to:

repeat a.-g. for one or more additional processes executing in the operating environment.

(v) the event is an expiry of a delay (vi) the PC is additionally configured to, subsequent to e.:

identify, in the memory space, based on the identified software framework, an unloaded code section log structure;

determine, based on identifying one or more code section identifiers in the unloaded code section log structure, that respective code sections have been executed.

(vii) the PC is additionally configured to:

adding the identified one or more code section identifiers to the RBOM.

(viii) the code section identifier is selected from a group consisting of:

a. a module name, b. a module path, c. a file path, d. a class name, e. a function name, f. a function signature, g. a method name, h. a method signature, i. a namespace, j. a scope, k. a file name, l. a file name with a starting line number, and m. a file name with a starting line number and ending line number.

(ix) the CSEI is based on at least one of a group consisting of:

a. a value of a pointer, identified from the code section description structure, to data or instructions of the first code section;

b. contents of a memory address that is written to by the first code section;

c. a value of a data field, identified from the code section description structure, indicative of whether code of the first code section has been cached;

d. a value of a data field, identified from the code section description structure, indicative of whether a data object associated with the first code section has been cached;

e. a value of a data field, identified from the code section description structure, utilized by a virtual machine for code use profiling, and f. a value of a data field, identified from the code section description structure, used by a virtual machine for profiling indicating a count of invocations of the first code section.

(x) the software framework is Java and the unloaded code section log structure is UnloadingEventLog (xi) the PC is configured to, responsive to determining that the software framework is Java, utilize a method-Counters field of a Methods structure as CSEI.

(xii) the PC is configured to, responsive to determining that the software framework is node.js, utilize a function_data field of a SharedFunctionInfo structure as CSEI.

(xiii) the PC is configured to, responsive to determining that the software framework is node.js, utilize a function_data field of a SharedFunctionInfo structure as CSEI (xiv) the PC is configured to, responsive to determining that the software framework is Ruby, utilize a flags field of a rb_method_entry_t structure as CSEI.

(xv) the PC is configured to, responsive to determining that the software framework is Ruby, utilize a total_calls field of a rb_iseq_constant_body structure as CSEI.

According to another aspect of the presently disclosed subject matter there is provided a processing circuitry-based method of identifying an executed code section of a software process, the method comprising:

a. accessing a memory space of a first process executing in an operating environment;

b. identifying, from contents of the memory space, a software framework of the first process;

c. finding, in the memory space, based on the identified software framework, a first code section description structure;

d. identifying, from the first code section description structure, a code section execution indicator (CSEI) associated with a first code section; and e. determining, based on a value of the associated CSEI, whether the first code section has been executed.

This aspect of the disclosed subject matter can further optionally comprise one or more of features (i) to (xv) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of determining a software runtime bill-of-materials (RBOM) of an operating environment, the method comprising:

a. accessing a memory space of a first process executing in an operating environment;

b. identifying, from contents of the memory space, a software framework of the first process;

c. finding, in the memory space, based on the identified software framework, a first code section description structure;

d. identifying, from the first code section description structure, a code section execution indicator (CSEI) associated with a first code section; and e. determining, based on a value of the associated CSEI, whether the first code section has been executed.

This aspect of the disclosed subject matter can further optionally comprise one or more of features (i) to (xv) listed above with respect to the system, mutatis mutandis, in any desired combination or permutation which is technically possible.

According to one aspect of the presently disclosed subject matter there is provided a system of determining a software runtime bill-of-materials (RBOM) of an operating environment, the system comprising a processing circuitry configured to:

a. identify a first software process executing in the operating environment;

b. determine, from data or metadata of a file associated with the first software process, a software framework of the first software process;

c. for each of one or more runnable files located in the operating environment and associated with the identified software framework:

i. determine, from metadata associated with the runnable file, a respective time of most recent access of the runnable file, ii. responsive to the respective time of most recent access of the runnable file being later than a start time of the first software process:

adding a respective file path of the runnable file to the RBOM.

In addition to the above features, the system according to this aspect of the presently disclosed subject matter can comprise one or more of features (i) to (iv) listed below, in any desired combination or permutation which is technically possible:

(i) the processing circuitry is further configured to perform the determination of the software framework based on at least one of:

a) a path of a file run by the first software process; and b) metadata of the file run by the first software process.

(ii) the processing circuitry is further configured to:

d. repeat a.-c. for one or more additional processes executing in the operating environment.

(iii) the processing circuitry is further configured to:

e. responsive to an event, repeat a.-d. for one or more additional iterations.

(iv) the event is an expiration of a delay.

According to another aspect of the presently disclosed subject matter there is provided a processing circuitry-based method of determining a software bill-of-materials (RBOM) of an operating environment, the method comprising:

a. accessing a memory space of a first process executing in the operating environment;

b. for one or more threads of the first process:

i. reading contents of one or more memory locations of a thread stack associated with the respective thread, ii. determining whether the contained value of a respective memory location is a code section execution address, and iii. responsive to the contained value of the respective memory location of the thread stack being a code section execution address:

a) determining, based on the memory space of the
first process and/or an executable file associated
with the first process, a code section identifier
associated with the code section, and
b) adding the code section identifier associated with
the code section to the RBOM.

This aspect of the disclosed subject matter can further
optionally comprise one or more of features (i) to (iv) listed
above with respect to the system, mutatis mutandis, in any
desired combination or permutation which is technically
possible.

According to another aspect of the presently disclosed
subject matter there is provided a computer program product
comprising a computer readable non-transitory storage
medium containing program instructions, which program
instructions when read by a processor, cause the processing
circuitry to perform a method of determining a software
runtime bill-of-materials (RBOM) of an operating environ-
ment, the method comprising:

a. identifying a first software process executing in the
operating environment;
b. determining, from data or metadata of a file associated
with the first software process, a software framework of
the first software process;
c. for each of one or more runnable files located in the
operating environment and associated with the identi-
fied software framework:
i. determining, from metadata associated with the run-
nable file, a respective time of most recent access of
the runnable file,
ii. responsive to the respective time of most recent
access of the runnable file being later than a start
time of the first software process:
adding a respective file path of the runnable file to the
RBOM.

This aspect of the disclosed subject matter can further
optionally comprise one or more of features (i) to (iv) listed
above with respect to the system, mutatis mutandis, in any
desired combination or permutation which is technically
possible.

According to one aspect of the presently disclosed subject
matter there is provided a system of determining a software
bill-of-materials (RBOM) of an operating environment, the
system comprising a processing circuitry configured to:

a. access a memory space of a first process executing in
the operating environment;
b. for one or more threads of the first process:
i. read contents of one or more memory locations of a
thread stack associated with the respective thread,
ii. determine whether the contained value of a respec-
tive memory location is a code section execution
address, and
iii. responsive to the contained value of the respective
memory location of the thread stack being a code
section execution address:
a) determine, based on the memory space of the first
process and/or an executable file associated with
the first process, a code section identifier associ-
ated with the code section, and
b) add the code section identifier associated with the
code section to the RBOM.

In addition to the above features, the system according to
this aspect of the presently disclosed subject matter can
comprise one or more of features (i) to (iv) listed below, in
any desired combination or permutation which is technically
possible:

6

(i) the processing circuitry is further configured to per-
form the determining the code section identifier based
on one or more of:
a) a symbol table of the executable file;
b) a debug section of the executable file;
c) a program database associated with the executable
file; and
d) an abstract syntax tree derivative of one or more
source code files associated with the executable file.
(ii) the processing circuitry is further configured to:
c. repeat a.-b. for one or more additional processes
executing in the operating environment.
(iii) the processing circuitry is further configured to:
d. responsive to an event, repeat a.-c. for one or more
additional iterations.
(iv) the event is an expiration of a delay According to another aspect of the presently disclosed
subject matter there is provided a processing circuitry-based
method of determining a software bill-of-materials (RBOM)
of an operating environment, the method comprising:

a) accessing a memory space of a first process executing
in the operating environment;
b) for one or more threads of the first process:
i. reading contents of one or more memory locations of
a thread stack associated with the respective thread,
ii. determining whether the contained value of a respec-
tive memory location is a code section execution
address, and
iii. responsive to the contained value of the respective
memory location of the thread stack being a code
section execution address:
a) determining, based on the memory space of the
first process and/or an executable file associated
with the first process, a code section identifier
associated with the code section, and
b) adding the code section identifier associated with
the code section to the RBOM.

This aspect of the disclosed subject matter can further
optionally comprise one or more of features (i) to (iv) listed
above with respect to the system, mutatis mutandis, in any
desired combination or permutation which is technically
possible.

According to another aspect of the presently disclosed
subject matter there is provided a computer program product
comprising a computer readable non-transitory storage
medium containing program instructions, which program
instructions when read by a processor, cause the processing
circuitry to perform a method of determining a software
bill-of-materials (RBOM) of an operating environment, the
method comprising:

a. accessing a memory space of a first process executing
in the operating environment;
b. for one or more threads of the first process:
i. reading contents of one or more memory locations of
a thread stack associated with the respective thread,
ii. determining whether the contained value of a respec-
tive memory location is a code section execution
address, and
iii. responsive to the contained value of the respective
memory location of the thread stack being a code
section execution address:
a) determining, based on the memory space of the
first process and/or an executable file associated
with the first process, a code section identifier
associated with the code section, and
b) adding the code section identifier associated with
the code section to the RBOM.

This aspect of the disclosed subject matter can further optionally comprise one or more of features (i) to (iv) listed above with respect to the system, mutatis mutandis, in any desired combination or permutation which is technically possible.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "reading", "writing", "detecting", "determining", "calculating", "receiving", "providing", "obtaining", "emulating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Ensuring security of modern computer systems can be a time-consuming and cumbersome task. In particular, ensuring that software components are updated and properly configured, —and in particular in response to security alerts—can require substantial organizational resources. It is noted that a computer system can include large numbers of software modules which are rarely or never invoked. Accordingly, it can be valuable to know which software code sections of an operational computer system are in fact in active use, and to prioritize the security maintenance of relevant modules or packages.

A list of currently active software modules can be termed "software bill-of-materials" (SBOM) or "runtime software bill-of-materials" (RBOM).

Example systems and methods for constructing an RBOM—and example use cases—are described in U.S. patent application Ser. No. 17/813,220 "Computer system enabled with runtime software module tracking", which is hereby incorporated by reference.

Some embodiments of the presently disclosed subject matter identify active (software functions, modules, object classes, "basic blocks" or other specific sections of code (e.g. as denoted by a source code filename and start line/end line), or other types of code sections. Some embodiments of the presently disclosed subject matter utilize the determined active code section information to construct an RBOM. Some methods described herein apply to specific types of operating environments or software frameworks, as will be described hereinbelow. Some embodiments of the presently disclosed subject matter utilize appropriate methods for different environments or frameworks, and thereby generate a combined RBOM.

As used herein, "active" code sections include code sections that are currently being executed or were executed on the current system (e.g. executed since system initialization, executed since a particular event, executed within a particular time frame). The term "managed software framework" is herein interpreted to include a system provided within an operating system (e.g. Microsoft™ Windows™, Linux™, Android™ etc.) which utilizes e.g. an interpreter or a virtual machine to execute code written in a particular language such as Java, Python, node.js etc.

FIG. 1 illustrates a flow diagram of an example method of dynamic loading and unloading of software code sections (e.g. functions) that can be executed by a managed software framework, in accordance with some embodiments of the presently disclosed subject matter.

A managed framework can load 105 a code section (for example: a function or software module) of an application into memory space (for example: in preparation for invocation by a currently executing module). In particular, there can be a type of code section description structure loaded into memory.

As the application executes, invocations of the code section of course affect 110 contents of the memory. In the present disclosure, memory locations (or structure fields) which predictably change due to processor invocation of a particular function (or module or other code section) are termed "code section execution indications" (CSEIs).

As will be discussed in detail below, some embodiments of the presently disclosed subject matter access memory of running processes, and utilize the code section execution indications to detect which code sections (e.g. functions, modules etc.) are active. Using this method, it is possible to maintain an RBOM (e.g. a function-granular RBOM, module-granular RBOM, or basic-block granular RBOM) as will be described in detail below.

Code section execution indications can include, by way of non-limiting example, the Java MethodCounters field (of the Method structure), or the node.js Function pointer (of the FunctionsHolder structure), as will be described below.

In some managed software frameworks (for example: recent versions of Java), the managed framework can—responsive to e.g. lack of use of the function or due to memory reclamation, unload 115 code section data from memory. Some such frameworks (e.g. Java) log 120 an indication of this unloading into a memory structure. The term "unloaded code section log" is herein interpreted to include such a memory structure including indications of unloading of code sections.

Figure 2B:
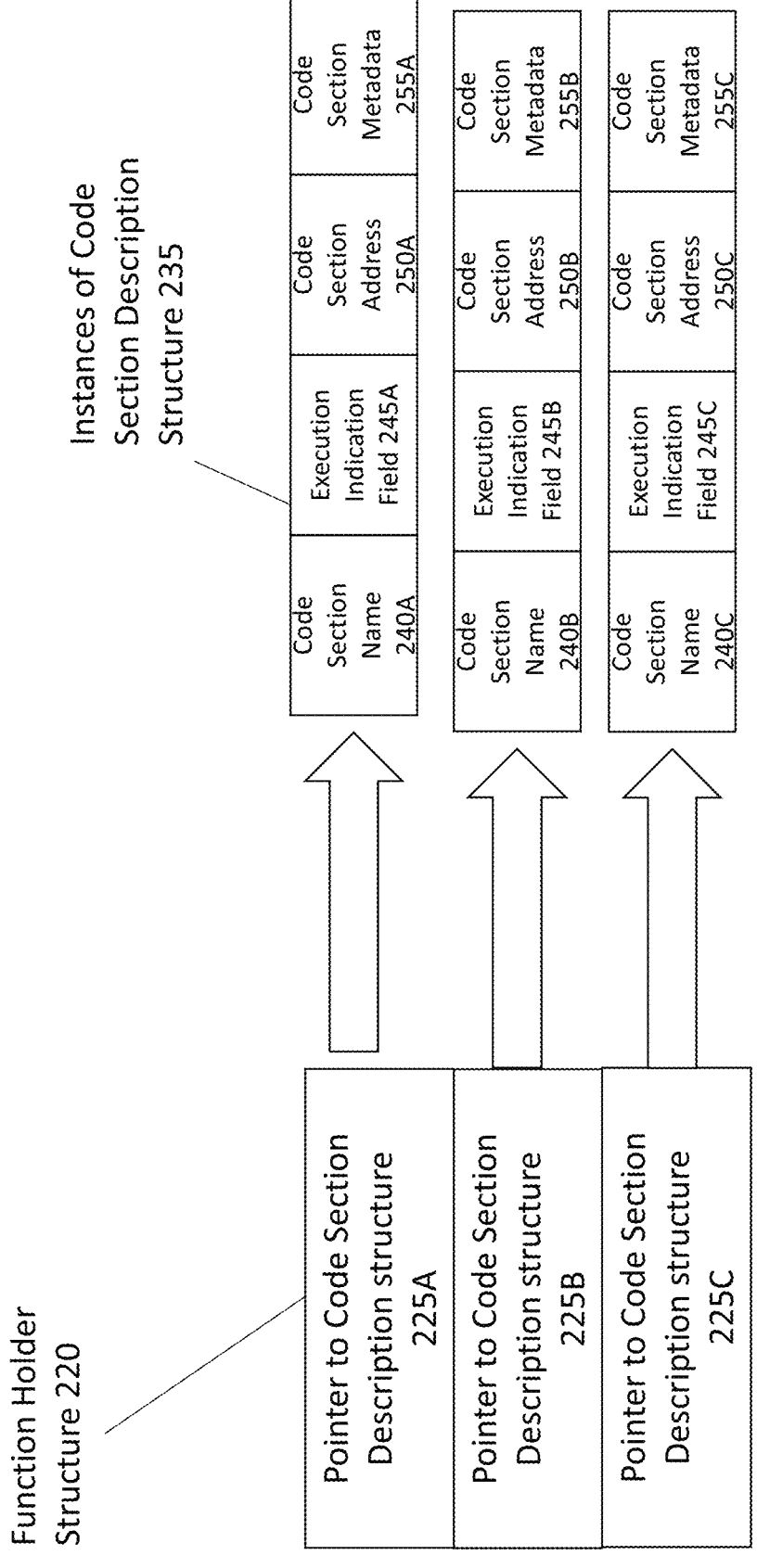

FIGS. 2A-2B illustrate generalized logical structures that can be present in implementations of managed software frameworks, in accordance with some embodiments of the presently disclosed subject matter.

FIG. 2A illustrates a process memory 205, which can include one or more memory sections 210 (i.e. portions of the memory available to a monitoring process). A memory section can include a framework-specific code section holder structure 220.

FIG. 2B illustrates an example code section holder structure 220, which includes one or more pointers 225A 225B 225C to respective code section description structure instances 235. A code section description structure instance can include e.g. code section name (e.g. function name, module name, module path, file path, class name, function signature, source file name with or without starting line number and/or ending line number etc.) 240A 240B 240C, code section execution indication field 245A 245B 245C, code section address 250A 250B 250C, and code section metadata 255A 255B 255C.

It is noted that the code section holder and code section descriptor structures can be divided among multiple structures, or integrated with other structures, and that fields therein can be encoded in various manners. It is further noted that these structures might not be present in some managed software frameworks.

It is noted that the term "code section description structure" is interpreted to include a data structure (or group of data structures) enabling access to, at least, a code section identifier (e.g. function name, function signature, source file name with line offset etc.) and an associated execution indication field.

Figure 3A:
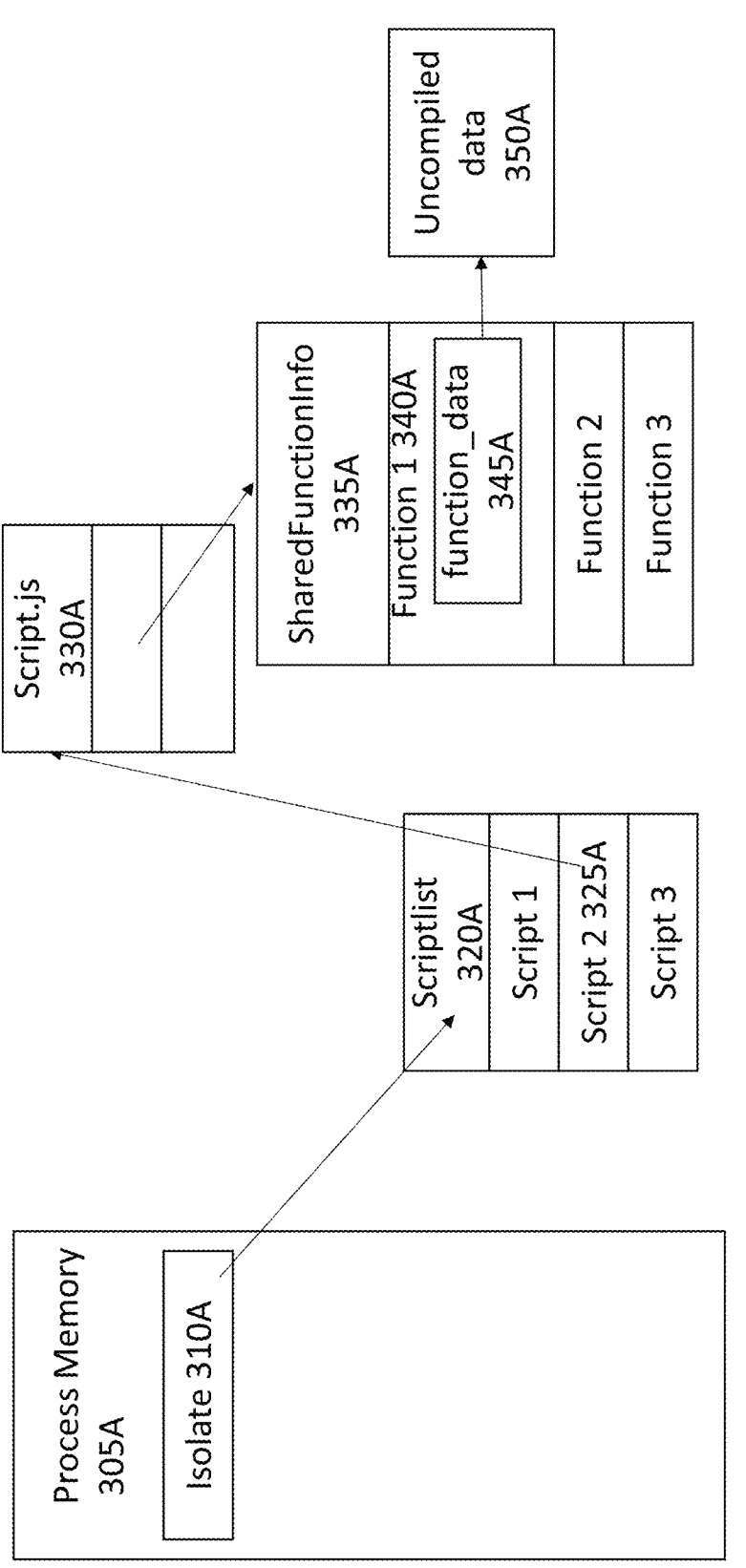
FIG. 3A illustrates an example memory map of a node.js process, in accordance with some embodiments of the presently disclosed subject matter.

FIG. 3A illustrates an example memory map of a node.js process, in accordance with some embodiments of the presently disclosed subject matter.

Process memory 305A can include one or more isolates 310A. An isolate can be an instance of node.js structures. Each isolate can include its own node.js scripts and methods.

Each isolate can include respective pointers (direct or indirect) to one or more scripts 325A located in a scriptlist 320A structure. Each script 325A can include a pointer to a script.js object 330A, which in turn can include a pointer to an array of pointers to SharedFunctionInfo structures 335A. Each SharedFunctionInfo structure 340A can contain function name and parameter info, as well as a "function_data" property 345A.

The function_data property 345A can be a pointer that can point to multiple types of objects. If the function_data property 345A points at a structure of type "Uncompiled-Data" 350A, then the function has not been recently executed, whereas the function_data property points at a structure of a different type in a case where the function has been recently executed.

Figure 3B:
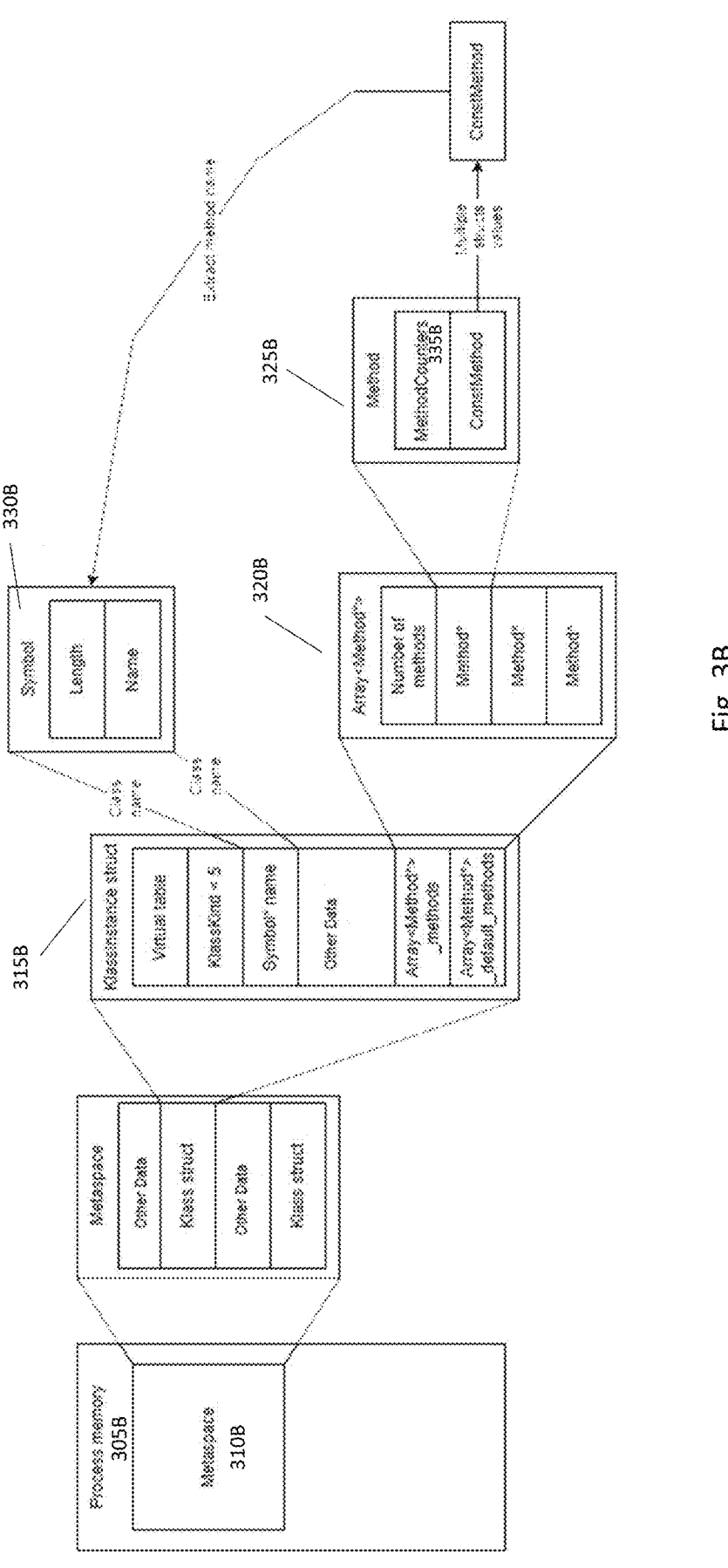
FIG. 3B illustrates an example memory map of a Java process, in accordance with some embodiments of the presently disclosed subject matter.

FIG. 3B illustrates an example memory map of a Java process, in accordance with some embodiments of the presently disclosed subject matter.

Process memory 305B can include a Metaspace 310B region, which in turn can contain instances of the KlassInstance structure 315B. Instances of the KlassInstance structure 315B can include an array of pointers to Symbol structures (which in turn can contain function signature data). Instances of the KlassInstance structure 315B can also include an array of pointers 320B to Method structures 325B. Method structures 325B can include pointers which lead back to Symbol structures 330B (including the function signature data), and can also include function execution addresses and metadata.

This metadata can include the MethodCounters 335B field, which is a field that can be used by the Java framework to profile system performance. As will be described below, some embodiments of the presently disclosed subject matter utilize the MethodCounters field for identification of active code sections, and optionally for RBOM construction.

Figure 4:
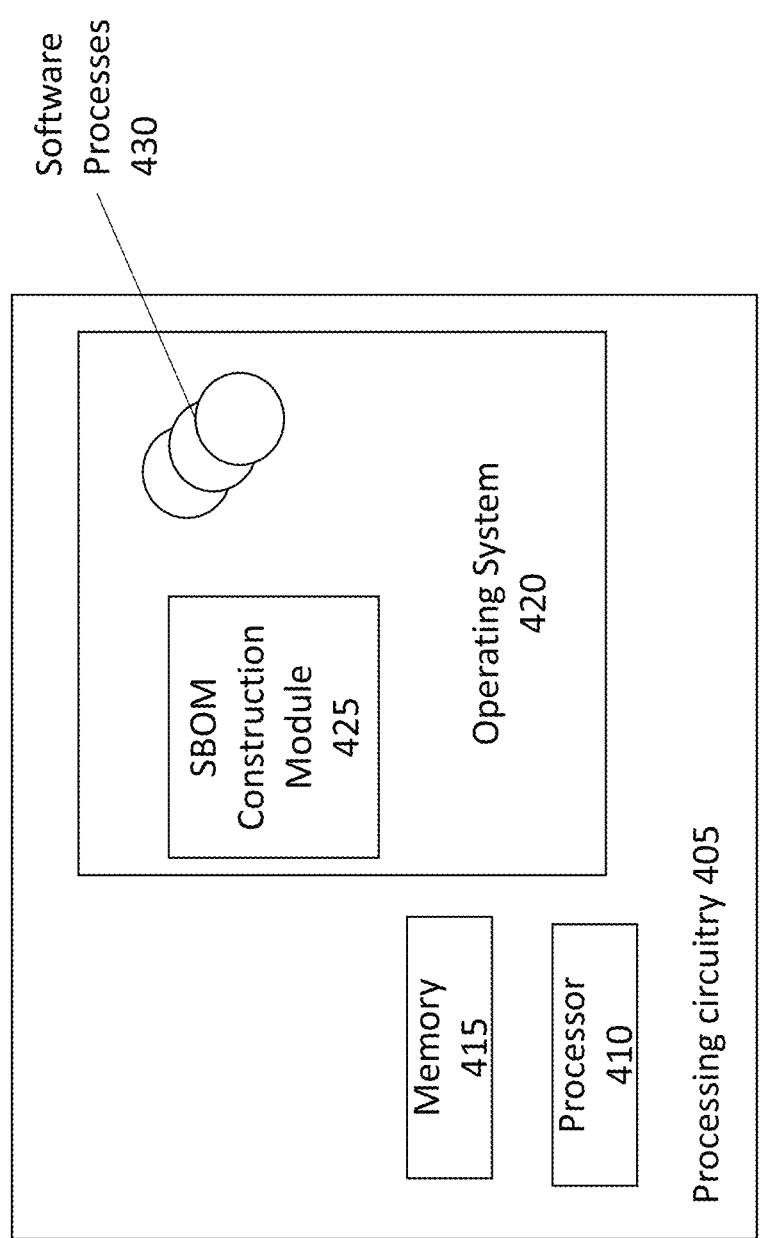
FIG. 4 illustrates a logical block diagram of an example system adapted for constructing a software runtime bill-of-materials (RBOM) using memory forensics, in accordance with some embodiments of the presently disclosed subject matter.

FIG. 4 illustrates a logical block diagram of an example system adapted for constructing an RBOM using memory forensics, in accordance with some embodiments of the presently disclosed subject matter.

Processing circuitry 405 can include a processor 410 and memory 415.

Processor 410 can be a suitable hardware-based electronic device with data processing capabilities, such as, for example, a general purpose processor, digital signal processor (DSP), a specialized Application Specific Integrated Circuit (ASIC), one or more cores in a multicore processor, etc. Processor 410 can also consist, for example, of multiple processors, multiple ASICs, virtual processors, combinations thereof etc.

Memory 415 can be, for example, a suitable kind of volatile and/or non-volatile storage, and can include, for example, a single physical memory component or a plurality of physical memory components. Memory 415 can also include virtual memory. Memory 415 can be configured to, for example, store various data used in computation.

Processing circuitry 405 can be configured to execute several functional modules in accordance with computer-readable instructions implemented on a non-transitory computer-readable storage medium. Such functional modules are referred to hereinafter as comprised in the processing circuitry. These modules can include, for example, operating system 420, RBOM construction module 425, and processes 430.

RBOM construction module 425 can be e.g. a process executing within operating system 420. RBOM construction module 425 can execute methods such as those described hereinbelow, thereby determining e.g. which software code sections are active (e.g. currently executing, recently executed, or executed within some time frame or since some event). RBOM construction module 425 can optionally use this determined information to create a list of active software modules ie. a "runtime software bill-of-materials" (RBOM).

FIG. 5 illustrates a flow diagram of an example method of identifying executed code sections of an application executing in a managed software framework, in accordance with some embodiments of the presently disclosed subject matter.

It is noted that the method illustrated in FIG. 5 can be utilized as part of determining a RBOM for a process executing within a managed software framework.

It is noted that the method illustrated in FIG. 5 can determine which software modules are active (i.e. have been executed), for utilization in security, management, or other purposes.

Processing circuitry 405 (RBOM construction module 425) can perform the method repeatedly, on multiple processes, determining which processes utilize a managed software framework, and in this manner generate e.g. a partial system RBOM i.e. a list of code sections invoked by applications utilizing managed frameworks (such as Java, node.js, Python etc.).

Processing circuitry 405 (RBOM construction module) can begin construction of an RBOM by accessing 505 memory of an executing process. By way of non-limiting example: on a Linux™ system, the processing circuitry 405 (e.g. RBOM construction module 425) can access a file located in /proc/<PID>/maps, where <PID> is a process identifier. FIG. 2 illustrates an example layout of process memory. By way of non-limiting example: on a Windows™ system, the processing circuitry 405 (e.g. RBOM construction module 425) can utilize ReadProcessMemory( ) which enables a process to read memory of a different process. Alternatively, another method of accessing process memory can be utilized. In other types of systems, a suitable method of accessing process memory can be utilized. It is noted that in some embodiments, processing circuitry 405 (RBOM construction module) can access a dump of a no longer active process.

Processing circuitry 405 (RBOM construction module 425) can next detect 510 the software framework of the currently analyzed process. Methods for detecting the software framework of a process can involve identification of framework-specific memory structures, shared libraries, or interpreters, or other techniques as known in the art. In some managed software frameworks (e.g. Java, node.js, python), a virtual machine, client, or interpreter or the like can be part of each application process, and can manage e.g. application functions or modules in accordance with the scheme described above, with reference to FIG. 1.

Processing circuitry 405 (RBOM construction module 425) can now, based on the detected software framework, locate 515 an instance of a code section description structure within process memory. As described above, a code section description structure can be a software structure (or group of structures) which specifies data pertaining to code section (e.g. function, module, basic block etc.) invocation. By way of non-limiting example, this data can include:

code section name (e.g. function name etc.)

Function parameters and return value type (in the case of a function)

Execution address

Metadata

Processing circuitry 405 (e.g. RBOM construction module 425) can locate one or more instances of code section description structures in a framework-specific manner.

For example, in a node.js process, as illustrated above with reference to FIG. 3A, processing circuitry 405 (e.g. RBOM construction module 425) can—by way of non-limiting example—first identify an isolate structure within process memory (as known in the art), and successively locate the roots table, script list, script.js, and SharedFunctionInfo structures 340A. SharedFunctionInfo structures 340A can thus be regarded as code section description structures (alone or in combination with other structures).

Similarly, in a Java process, as illustrated above with reference to FIG. 3B, processing circuitry 405 (e.g. RBOM construction module 425) can—by way of non-limiting example—first identify a Metaspace 310B structure within process memory 305B (as known in the art), and successively locate the KlassInstance structure 315B, Array<Method> pointer structure 320B, and finally the Method structures 325B. Method structures 325B can thus be regarded as examples of code section description structures (alone or in combination with other structures).

It is further noted that in a Ruby process, a structure rb_method_entry_t can maintain a Flags property, which in turn can contain multiple sub-properties. In some examples, the "METHOD_ENTRY_CACHED" bit (the 21th bit, (bit mask 0x100000)) is either on or off in the flags property.

The structure rb_method_entry_t can thus be regarded as an example code section description structure.

Processing circuitry 405 (e.g. RBOM construction module 425) can, by way of non-limiting example, detect if the function was executed by checking if the "METHOD_ENTRY_CACHED" bit is on or off in the flags property. In some examples, "METHOD_ENTRY_CACHED" is the 21th bit, (bit mask 0x100000)

Processing circuitry 405 (e.g. RBOM construction module 425) can—by way of non-limiting example—evaluate whether the mathematical term: flags & 0x100000 is non-zero, and if so can infer the code section was executed.

It is further noted that if Ruby "just-in-time" (JIT) is enabled, rb_method_entry_t can contain a pointer to a chain of structures which eventually reaches a "rb_iseq_constant_body" structure. A rb_iseq_constant_body structure can have the property "total_calls" indicating the number of times the function was called (similar to the Java example above). The structure rb_method_entry_t can thus also be regarded as an example code section description structure.

It is noted that the examples of code section description structures are non-limiting, and are likely to change in subsequent versions of these software frameworks. Processing circuitry 405 (e.g. RBOM construction module) can next locate 520 a code section execution indicator (CSEI) associated with a code section descriptor structure (i.e. associated with a function, basic block, or module instance etc).

As described above with reference to FIG. 1, managed software frameworks include data structures (termed CSEIs) that processing circuitry 405 (e.g. RBOM construction module 425) can monitor to determine if code sections have been executed.

For example, in a node.js process, processing circuitry 405 (e.g. RBOM construction module 425) can—by way of non-limiting example—read a function_data pointer from the sharedFunctionInfo structure 330A (i.e. function_data is the CSEI). If the function_data pointer points to a structure that is not of type "UncompiledData", then a function has been executed, and has thus been identified as active.

By way for further non-limiting example: in a Java process, processing circuitry 405 (e.g. RBOM construction module 425) can read MethodCounters 335B from the Method structure 325B (i.e. MethodCounters is the CSEI). The Java environment utilizes MethodCounters 335B to monitor the extent of utilization of the function, for purposes of performance profiling. If the value of MethodCounters 335B is greater than 0, then the function has been executed, and has thus been identified as active.

By way for further non-limiting example: in a Ruby process, processing circuitry 405 (e.g. RBOM construction module 425) can—by way of non-limiting example—evaluate whether the mathematical term: flags (of the rb_method_entry_t structure) & 0x100000 is non-zero, and if so can infer the code section was executed and can thus been identified as active.

By way for further non-limiting example: in a Ruby process, processing circuitry 405 (e.g. RBOM construction module 425) can—by way of non-limiting example—evaluate whether the mathematical term: flags (of the rb_method_entry_t structure) & 0x100000 is non-zero, and if so can infer the code section was executed and can thus been identified as active.

By way for further non-limiting example: in a Ruby process, processing circuitry 405 (e.g. RBOM construction module 425) can, by way of non-limiting example, determine if total_calls of a rb_method_entry_t structure is non-zero, and if so can infer that the code section was executed.

It is noted that the examples of CSEIs are non-limiting, and are likely to change in subsequent versions of these software frameworks.

Having determined that a code section has been executed, processing circuitry 405 (e.g. RBOM construction module 425) can determine code section identifier data from the code section description structure. Code section identifier data can include, for example: a name or other identifier of the code section, and in some examples (e.g. object-oriented languages) also the function parameters and return value type.

By way of non-limiting example: in node.js, processing circuitry 405 (e.g. RBOM construction module 425) can access the function name directly from the sharedFunction-Info structure 330A.

By way of further non-limiting example: in Java, processing circuitry 405 (e.g. RBOM construction module 425) can access the ConstMethod field of the Method structure, and follow pointers to access the Symbol structure (which contains the function signature data), as illustrated in FIG. 2B.

Processing circuitry 405 (e.g. RBOM construction module 425) can then optionally add the code section identifier data to the RBOM.

Processing circuitry 405 (e.g. RBOM construction module 425) can repeat 530 these steps to identify additional code section descriptor structures in the process memory space, detect whether they have been utilized, and if so to add the code section identifier data to the RBOM.

Optionally: processing circuitry 405 (e.g. RBOM construction module 425) can access a structure in the process memory that logs when code sections have been unloaded from memory (termed unloaded code sections log above), and identify 535 any such unloaded code sections, thereby determining that they may have been active.

Processing circuitry 405 (e.g. RBOM construction module 425) can assume that the code was active, and write code section identifier data associated with the unloaded code sections to the RBOM.

Processing circuitry 405 (e.g. RBOM construction module 425) can (optionally) delay for a delay period, or until an occurrence of an event, and then perform the steps of the method again, so as to detect subsequently executed code sections of the process, and then optionally add these to the RBOM.

Figure 6:
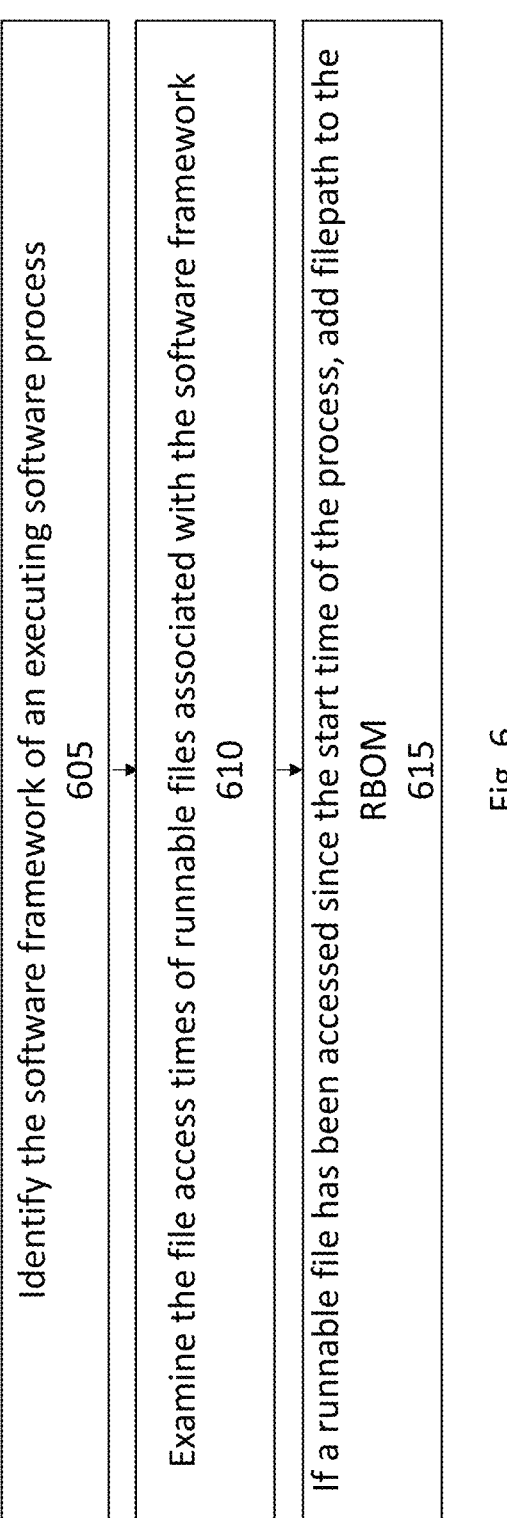
FIG. 6 illustrates flow diagram of an example method of constructing a software RBOM based on file access times, in accordance with some embodiments of the presently disclosed subject matter.

FIG. 6 illustrates a flow diagram of an example method of constructing a software RBOM based on file access times, in accordance with some embodiments of the presently disclosed subject matter.

The method illustrated in FIG. 6 can be applicable to processes utilizing an application framework which performs on-demand runtime access of code files (e.g. Python). In the present description, the term "runnable files" is interpreted to include files which are executed (e.g executable files resulting from a compilation process), as well as files of scripting languages or intermediate format files which are run e.g. on virtual machines or via interpreters (e.g. Python, Node.js etc.)

Processing circuitry (e.g. RBOM construction module 425) can begin by identifying 605 the software framework of a running process. Processing circuitry (e.g. RBOM construction module 425) can do this, for example, from observing the data or metadata of a file associated with the running process. By way of non-limiting example, processing circuitry (e.g. RBOM construction module 425) can examine e.g. the contents, file path, file extension, or file metadata of the runnable file. For example: if the process was initialized by running the command "foo.py", then processing circuitry (e.g. RBOM construction module 425) can infer that the process is based on Python. Alternatively, processing circuitry (e.g. RBOM construction module 425) can identify the software framework from a different file (e.g. memory, as described above), or utilizing a different method.

Next, processing circuitry (e.g. RBOM construction module 425) can examine 610 file metadata indicative of file access times (e.g. times of most recent file reads as maintained by a file system) of runnable files associated with the framework. For example: in the case of Python, processing circuitry (e.g. RBOM construction module 425) can examine most recent file access times for all Python library files (or all Python libraries files potentially usable by the process).

When processing circuitry (e.g. RBOM construction module) finds a file with an access time more recent than e.g. the start time of process, processing circuitry (e.g. RBOM construction module 425) can add 615 the filepath to the RBOM.

Processing circuitry (RBOM construction module 425) can perform the method repeatedly, on multiple processes, and in this manner (or in conjunction with other methods described hereinabove) generate a full or partial system RBOM i.e. a list of files or code sections invoked by applications.

Figure 7:
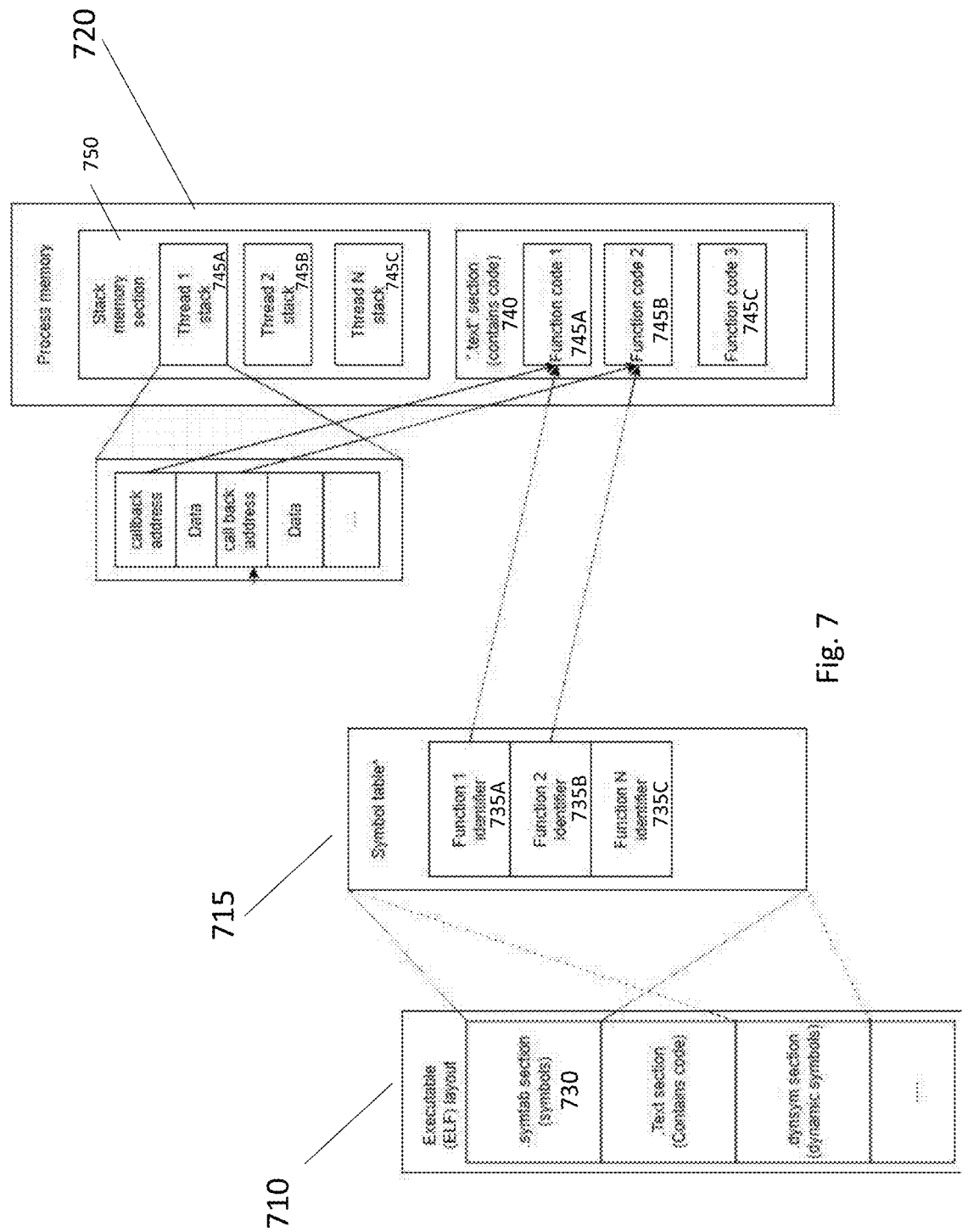
FIG. 7 illustrates example memory layouts of an executable file and process memory, which can be usable in a stack probing-based method of determining a software RBOM, in accordance with some embodiments of the presently disclosed subject matter.

FIG. 7 illustrates example memory layouts of an executable file and process memory, which can be usable in a stack probing-based method of constructing a software RBOM, in accordance with some embodiments of the presently disclosed subject matter.

Executable file 710 can be a file that resides on a storage medium of a computer, and that is executed, for example, via a command line instruction. In some embodiments, executable file 710 can be Executable and Linkable Format (ELF) file.

Executable file 710 can include a .symtbl section 730, which in turn can include a symbol table 715. The symbol table 715 can contain a series of table entries 735A 735B 735C, where each table entry can include data indicative of a function signature, function metadata, and a memory pointer that represents an offset of the start address of function code 745A 745B 745C in the execution memory region (i.e. ".text" section 740 of process memory).

Process memory 720 can include a stack memory section 750, which in turn can include a number of thread stacks 755A 755B 755C. A thread stack can include data describing a series of nested function calls, where each nested function has placed data and a callback address on the stack. In some examples, a thread stack is an operating system based structure such as a Linux thread. In some other examples, a thread stack is a software framework-specific structure enabling multiprocessing, such as (for example) a "goroutine" of the Go language.

In some embodiments of the presently disclosed subject matter, processing circuitry (e.g. RBOM construction module) can monitor these structures to construct an RBOM, as described below.

FIG. 8 illustrates a flow diagram of an example stack probing-based method of constructing a software RBOM, in accordance with some embodiments of the presently disclosed subject matter.

The RBOM construction method illustrated in FIG. 8, can—in some embodiments—be applied across a variety of software frameworks (including, for example, compiled and interpreted applications). In particular, in some embodiments, this method is suited for use with compiled languages such as C and C++.

Processing circuitry 405 (e.g. RBOM construction module 425) can perform the method repeatedly, on multiple processes, and in this manner (or in conjunction with other methods described hereinabove) generate a full or partial system RBOM i.e. a list of functions invoked by applications.

Processing circuitry 405 (e.g. RBOM construction module 425) can access 805 a memory space of a process. Processing circuitry 405 (RBOM construction module 425) can access the memory space, for example, in the manner described for managed software frameworks as described above with reference to FIG. 4, or by another suitable method Processing circuitry 405 (e.g. RBOM construction module 425) can next select 810 a thread of the process, and access the associated thread stack (for example: as illustrated in FIG. 7)

Processing circuitry 405 (e.g. RBOM construction module 425) can then scan 815 one or more memory addresses (for example: all memory addresses) in the stack, and determine, for each memory address, whether the contained value of the memory contents is a pointer to executable code (i.e. a callback address) of a code section which e.g. invoked a function.

Processing circuitry 405 (e.g. RBOM construction module 425) can perform this determination by—for example— obtaining, from the operating system, the starting memory address of a region in which the executable function code is stored. This region is herein termed the "execution memory region".

Processing circuitry 405 (e.g. RBOM construction module 425) can then access a symbol table of the executable file from which the process was initiated. A symbol table can indicate function signature data, together with values that indicate offset locations of functions in the execution memory region. By way of non-limiting example: in a Linux™ system, processing circuitry 405 (e.g. RBOM construction module 425) can access one or more of: a main symbol table (e.g. .symtab of an ELF file), a dynamic symbol table (.dynsym), debug sections (such as .debug_line, .debug_loc) etc. By way of non-limiting example: in a Windows™ system, processing circuitry 405 (e.g. RBOM construction module 425) can utilize an appropriate mechanism such as program database (PDB) files. In some examples, processing circuitry 405 (e.g. RBOM construction module 425) utilizes an abstract syntax tree (AST) derived from one or more source code files associated with the executable file. ASTs are described in, for example, "On Matching Binary to Source Code" by Arash Shahkar (2016) |(users.encs.concordia.ca/~mmannan/student-resources/ Thesis-MASc-Shahkar-2016.pdf)

Accordingly, processing circuitry 405 (RBOM construction module 425) can utilize awareness of the location of the execution memory region and the function offsets, and determine whether the contents of the stack memory is pointing at instructions that are part of a specific code section (e.g. a function, a part of a function, or a class or module including a function etc.).

When a function is identified, processing circuitry 405 (e.g. RBOM construction module 425) can determine 820 the function signature data from the symbol table, and add 825 it to the RBOM. To identify a different granularity of code section, processing circuitry 405 (e.g. RBOM construction module 425) can, for example, utilize data from the symbol table to identify a function, and then access e.g. a data structure describing e.g. a class or module or larger code section including the function, and can determine a code section identifier from the appropriate data structure. Alternatively, processing circuitry 405 (e.g. RBOM construction module 425) can, for example, utilize data from the symbol table to access an identifier of a smaller code section (e.g. a particular source file and line number).

Processing circuitry 405 e.g. (e.g. RBOM construction module 425) can optionally repeat 830 the steps for one or more additional threads/thread stacks of the process (for example: all thread stacks of the process).

Processing circuitry 405 (e.g. RBOM construction module 425) can periodically repeat the entire series of steps, so as to obtain wide coverage of the functions being invoked in the process.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A system of determining a software bill-of-materials (RBOM) of an operating environment, the system comprising a processing circuitry configured to:
   a. access a memory space of a first process executing in the operating environment;
   b. for one or more threads of the first process:
      i. read contents of one or more memory location of a thread stack associated with the respective thread,
      ii. determine whether a contained value of a respective memory location is a code section execution address, and
      iii. responsive to the contained value of the respective memory location of the thread stack being a code section execution address:
         a) determine, based on the memory space of the first process and/or an executable file associated with the first process, a code section identifier associated with a code section including the code section execution address, and
         b) add the code section identifier associated with the code section to the RBOM.

2. The system of claim 1, wherein the processing circuitry is further configured to perform the determining the code section identifier based on one or more of:
   a. a symbol table of the executable file;
   b. a debug section of the executable file;
   c. a program database associated with the executable file and
   d. an abstract syntax tree derivative of one or more source code files associated with the executable file.

3. The system of claim 1, wherein the processing circuitry is further configured to:

e. repeat a.-b. for one or more additional processes executing in the operating environment.

4. The system of claim 3, wherein the processing circuitry is further configured to:

f. responsive to an event, repeat a.-d. for one or more additional iterations.

5. The system of claim 4, wherein the event is an expiration of a delay.

6. A processing circuitry-based method of determining a software bill-of-materials (RBOM) of an operating environment, the method comprising:

a. accessing a memory space of a first process executing in the operating environment;

b. for one or more threads of the first process:

i. reading contents of one or more memory locations of a thread stack associated with the respective thread, ii. determining whether a contained value of a respective memory location is a code section execution address, and iii. responsive to the contained value of the respective memory location of the thread stack being a code section execution address:

a) determining, based on the memory space of the first process and/or an executable file associated with the first process, a code section identifier associated with a code section including the code section execution address, and b) adding the code section identifier associated with the code section to the RBOM.

7. A computer program product comprising a computer readable non-transitory storage medium containing program instructions, which program instructions when read by a processor, cause the processing circuitry to perform a method of determining a software bill-of-materials (RBOM) of an operating environment, the method comprising:

a. accessing a memory space of a first process executing in the operating environment;

b. for one or more threads of the first process:

i. reading contents of one or more memory locations of a thread stack associated with the respective thread, ii. determining whether a contained value of a respective memory location is a code section execution address, and iii. responsive to the contained value of the respective memory location of the thread stack being a code section execution address:

a) determining, based on the memory space of the first process and/or an executable file associated with the first process, a code section identifier associated with a code section including the code section execution address, and b) adding the code section identifier associated with the code section to the RBOM.

\* \* \* \* \*